Patented Feb. 20, 1951

2,542,471

UNITED STATES PATENT OFFICE 2,542,471

REMOVAL OF PEROXIDES FROM CRACKED GASOLINE BY CATALYTIC HYDROGENATION

Richard C. Brandon, Elizabeth, N. J., assignor to Standard Oil Development Company, a corporation of Delaware No Drawing. Application June 15, 1946, Serial No. 677,092

3 Claims. (Cl. 196—35)

This invention relates to a method for eliminating undesirable oxygenated contaminants from hydrocarbon compositions without making adverse changes in the hydrocarbons.

Cracked petroleum distillates and unsaturated hydrocarbons derived by other processes commonly contain unstable hydrocarbons which readily take up oxygen to form unstable organic peroxides. With some hydrocarbon stocks, such as fluid catalyst cracked heavy naphtha, formation of peroxides occurs in a few hours. These peroxides are undesirable in gasoline motor fuels because they produce a marked increase in gum content and lower antiknock value of the fuel. In olefinic stocks prepared for manufacture of polymers, the unstable peroxides have undesirable effects in the polymerization processes.

An object of this invention is to provide a method for eliminating the peroxides with a minimum change of hydrocarbons contaminated by the peroxides.

A further object is to effect elimination or reduction of peroxide contamination in a hydrocarbon composition by a controlled selective treatment with hydrogen in the presence of a catalyst resistant to sulfur poisoning and with a long catalyst life.

A still further object is to obtain selective reaction of peroxides with hydrogen in the presence of a catalyst under conditions where cracking does not occur and where hydrogenation of unsaturated hydrocarbons and aromatic hydrocarbons is restricted.

It is now found that the objects set forth are accomplished by treating a peroxide contaminated hydrocarbon composition with hydrogen in the presence of a noble metal from the platinum group, notably platinum or palladium, and on an alumina carrier, more particularly when the catalyst contains from 0.1 to 10% of the noble metal on the carrier. Both the metals, platinum and palladium, are very selective for reducing the organic peroxides at temperatures below 400° F. The palladium catalyst is more selective than the platinum catalyst at temperatures between about 200 and 500° F.; the platinum catalyst is more selective at temperatures from about 100° F. to 400° F. Preferably a moderate pressure of about atmospheric pressure is used.

Two kinds of procedures may be used for incorporating the platinum group metal with the carrier (1) impregnation of the carrier with a salt or acid solution (e. g., ammonium chloroplatinate, chloroplatinous acid, or a corresponding palladium compound), followed by slow drying, and heat decomposition or reduction of the deposited compound; and (2) mulling of the carrier in powdered form with admixed or deposited colloidal size particles of the noble metal (e. g., platinum black), followed by extruding or pilling. The mulled mixture is extruded wet, then dried. The pilled mixture is dry when compressed into a compact form, such as a pill or pellet. The pilled or pelleted catalytic material is a preferred type for the present method.

The pelleted catalytic material may be used in a fixed bed type of operation or may be granulated to smaller size for use with a fluid or moving catalyst technique.

The carrier of the nature of alumina is a hydrous oxide having ultramicroscopic pores. Silica gel is another example of this type of carrier which may be used.

Catalytic materials used in obtaining tabulated results that follow contained 2% by weight of the metals platinum and palladium on alumina in the form of compressed cylindrical pellets of about 1/8 x 1/8-inch size; however, variations may be made in the shape, size, ingredients, and proportions, as explained.

For the purpose of illustration, the following tabulated data are given on the treatment of a heavy naphtha produced by fluid catalyst cracking:

TABLE 1

Removal of peroxides from fluid catalyst heavy naphtha

| Catalyst | Feed | 2% Pt on $Al_2O_3$ | | | 2% Pd on $Al_2O_3$ | |
|---|---|---|---|---|---|---|
| Temperature, ° F | | 200 | 300 | 400 | 200 | 400 |
| Pressure | | | Atmospheric | | | |
| Naphtha Feed Rate, V./V./Hr. | | | 1.0 | | | |
| Hydrogen Feed Rate, CF/B | | | 1,500 | | | |
| Octane Rating: | | | | | | |
|   Motor—Clear | 78.9 | 80.8 | 81.9 | 79.6 | 82.0 | 81.6 |
|   +3 ml. TEL/gal | 84.4 | 86.3 | 86.4 | 85.4 | 87.4 | 85.7 |
|   Research—Clear | 89.8 | 93.3 | 93.4 | 92.5 | 93.6 | 94.1 |
|   +3 ml. TEL/gal | 95.4 | 98.1 | 98.0 | 97.8 | 98.7 | 98.2 |
| Stability Inspections: | | | | | | |
|   Peroxide Number | 23.7 | 0.3 | 0.2 | 0.1 | 0.1 | Trace |
|   ASTM Breakdown [1] | 75 | 1,440+ | 1,440+ | 1,440+ | 1,440+ | 1,440+ |
|   Copper Dish Gum [1] | 583 | 4 | 2 | 2 | 7 | 5 |

[1] With 1 lb. n-butyl aminophenol inhibitor per 5,000 gal.

The results given in Table 1 show that the peroxide number was reduced from 23.7 to 0.3 or less. In every case the reduction in peroxide number was accompanied by increases of 1 to 3 points in clear and leaded octane ratings, and by improved stability as measured by the ASTM breakdown tests, wherein resistance to breakdown was increased from 75 to more than 1440 minutes. Copper dish gum was reduced from 583 to 7 or less which also shows marked improvement in stability.

As a second example, light naphtha from fluid catalyst cracking was treated under similar conditions. As shown in the following tabulation, the peroxide number was reduced from 5.1 to a maximum of 0.1 while both octane ratings and storage stability were definitely improved.

TABLE 2

*Removal of peroxides from fluid catalyst light naphtha*

| Catalyst | Feed | 2% Pt on Al$_2$O$_3$ | | 2% Pd on Al$_2$O$_3$ | |
|---|---|---|---|---|---|
| Temperature, °F | | 200 | 400 | 200 | 400 |
| Pressure | | Atmospheric | | | |
| Naphtha Feed Rate, V./V./Hr. | | 1.0 | | | |
| Hydrogen Feed Rate, CF/B | | 1,500 | | | |
| Octane Rating: | | | | | |
| Motor—Clear | 79.6 | 80.8 | 78.4 | 80.7 | 78.6 |
| +3 ml. TEL/gal | 86.5 | 86.1 | 89.5 | 85.7 | 84.6 |
| Aviation+4.6 ml. TEL/gal | 87.1 | 89.8 | 91.7 | 88.7 | 87.5 |
| Stability Inspections: | | | | | |
| Peroxide Number | 5.1 | Nil | Nil | Trace | 0.1 |
| ASTM Breakdown [1] | 355 | 815 | 1,440+ | 740 | 735 |
| Copper Dish Gum [1] | 43 | 1 | 1 | 6 | 2 |
| Bromine Number | 21 | 22 | 9 | 19 | 21 |

[1] With 1 lb. n-butyl aminophenol inhibitor per 5,000 gal.

It is to be noted that the treatment was controllable to prevent any substantial change in the bromine number, and in the same respect any substantial change in the characteristics of the hydrocarbon components. Thus, the unsaturated and aromatic hydrocarbon components desirable for high antiknock value remain unchanged.

The described treatment is advantageously applicable for refining a motor fuel stock which has become contaminated during storage or otherwise by oxidation of its unstable hydrocarbon components. It may be noted that this type of treatment satisfactorily supplants the former known method of removing peroxides by caustic washing and redistillation. Furthermore, the present method of removing peroxides is advantageously applicable to unsaturated hydrocarbon stocks to be used for polymerization when it is important to avoid additions of anti-oxidants or polymerization inhibitors.

To obtain substantially complete elimination of the peroxides with the present method, an excess of hydrogen, i. e., excess in amount necessary for complete reaction with the peroxides, is used. The excess hydrogen, however, does not react with unsaturated hydrocarbons if the temperature of the catalyst is controlled as indicated.

I claim:

1. The method of selectively reducing unstable oxygen-containing organic compounds in cracked gasoline containing substantial amounts of olefins, consisting essentially of selectively reacting the oxygen-containing compounds with hydrogen at a temperature below about 400° F. during contact with compact catalytic material of a synthetic gel carrier having ultramicroscopic pores selected from the class consisting of silica gel and alumina gel and supporting 0.1 to 10% by weight of a colloidal platinum group noble metal selected from the class consisting of platinum and palladium, whereby no significant change in olefin characteristics of said cracked gasoline is obtained.

2. The method of eliminating peroxides from an unsaturated cracked gasoline, which comprises passing gasoline vapors containing the peroxides with excess hydrogen over platinized alumina synthetic gel pellets containing 0.1 to 10% by weight of colloidal platinum at a temperature in the range of about 100° to 400° F.

3. The method of claim 1 carried out under substantially atmospheric pressure.

RICHARD C. BRANDON.

REFERENCES CITED

The following references are of record in the file of this patent:

UNITED STATES PATENTS

| Number | Name | Date |
|---|---|---|
| 1,908,286 | Dorrer | May 9, 1933 |
| 2,115,781 | Morrell | May 3, 1938 |
| 2,143,364 | Taylor | Jan. 10, 1939 |
| 2,279,277 | Shoemaker | Apr. 7, 1942 |
| 2,317,683 | Greensfelder | Apr. 27, 1943 |
| 2,400,012 | Littmann | May 7, 1946 |